3,341,507
PEROXYDICARBOXYLIC ACID ESTERS AND POLYMERIZATION PROCESSES EMPLOYING SAME
James E. Guillet, Don Mills, Ontario, Canada, and Edmund B. Towne, Kingsport, Tenn., assignors to Eastman Kodak Company, Rochester, N.Y., a corporation of New Jersey
No Drawing. Continuation of application Ser. No. 313,430, Oct. 3, 1966. This application May 23, 1966, Ser. No. 552,336
9 Claims. (Cl. 260—89.1)

This application is a continuation of application Ser. No. 313,430 filed Oct. 3, 1966, and now abandoned.

This invention relates to the polymeriaztion of ethylenically unsaturated polymerizable compounds and particularly to novel catalysts for these polymerization processes. In a specific aspect, this invention relates to novel dialkylperoxymalonic acid esters and their use as catalysts in the polymeriaztion of ethylenically unsaturated polymerizable compounds.

It is known that ethylenically unsaturated compounds, particularly ethylene, can be polymerized at temperatures in the range of about 40° to about 400° C. at atmospheric or higher pressures, for example, 5,000 p.s.i. or higher. Catalysts that have been suggested for use in these processes include oxygen, per-salts, diacyl peroxides, metal alkyl and azo compounds. It is general practice when such catalysts are employed to use very small concentrations so that the catalytic residues do not have to be removed from the polymer after it is formed. However, certain of the residues of the aforementioned free radical catalysts contain functional groups such as acid or ester carbonyl which tend to deleteriously affect the properties of the polymer. For example, the presence of acid or ester carbonyl in polyethylene tends to increase its dielectric loss factor which limits the use of the polymer in electrical applications such as use in telephone wire insulation, high-frequency cable, television cable, etc. It is therefore, desirable to use a catalyst in polymerizing the ethylenically unsaturated compounds which gives a very high yield of polymer per gram of catalyst since this will reduce the amount of detrimental catalyst residue left after polymerization. Furthermore, the use of a very highly effective catalyst in such a polymeriaztion process obviously makes the process more attractive from an economic standpoint.

Prior art organic peroxides are also subject to a number of significant disadvantages which limit their use as polymerization catalysts. One such deficiency in prior art organic peroxides has been the inability of any one of these compounds to operate effectively as a catalyst over a broad temperature range. It would, of course, be desirable to have an organic peroxide catalyst free of this deficiency.

It is evident, therefore, that the state of the art will be greatly enhanced by providing novel organic peroxides that are effective polymerization catalysts over a broad temperature range and which give yields of polymer to catalyst up to 5 times that of prior art organic peroxide catalysts. Likewise, a noteworthy contribution to the art will be a method for the polymeriaztion of ethylenically unsaturated polymerizable compounds employing such organic peroxides as catalysts.

Accordingly, it is an object of this invention to provide novel organic peroxides that are effective to polymerize ethylenically unsaturated polymerizable compounds.

Another object of this invention is to provide a novel process for the polymerization of ethylenically unsaturated polymerizable compounds over a broad temperature range employing a peroxydicarboxylic acid ester as the catalyst.

Another object of this invention is to provide a novel process for the polymerization of ethylene at high pressure over a broad temperature range in the presence of a peroxylicarboxylic acid ester that is two to five times more efficient in this process than conventional peroxide catalysts.

Other objects of this invention will become apparent upon an examination and consideration of the specification and claims that follow.

In accordance with this invention, it has been found that ethylenically unsaturated polymerizable compounds, and particularly ethylene, can be polymerized at temperatures in the range of about 60° to about 250° C. and a pressure in the range of about atmospheric pressure to about 50,000 p.s.i. in the presence of a peroxydicarboxylic acid ester having the formula:

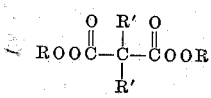

where each R is an alkyl, cycloalkyl, lower alkoxy substituted alkaryl or aryl radical containing 3–14 carbon atoms and each R' is an alkyl radical containing up to 8 carbon atoms.

The novel dialkylperoxymalonic acid esters employed as catalysts in the practice of this invention are particularly effective for the polymerization of ethylene over a broad temperature range which makes it possible to prepare polyethylene having distinct characteristics. A particularly valuable type of polyethylene is medium density polyethylene, i.e., polyethylene having a density in the range of about 0.935 to about 0.945. Medium density polyethylene is a very valuable polymer for specific applications since it combines many of the desirable properties of both low and high density polyethylene.

Another significant feature of this invention is that the diperoxy monoalkyl malonic acid esters are not effective catalysts in the practice of this invention. Thus, the monoalkylperoxymalonic acid esters decompose practically instantaneously under polymerization conditions where the dialkylperoxymalonic acid esters are highly effective catalysts, as shown by Example 1 which follows. Furthermore, peroxydicarboxylic acid esters such as di-tert-butyl peroxyoxalate are also ineffective in the practice of this invention, as shown by Examples 1 and 8 which follow. Thus, it is surprising that the specific dialkylperoxymalonic acid esters described hereinabove are highly effective catalysts for the polymerization of ethylenically unsaturated polymerizable compounds over a broad temperature range.

As already indicated, the peroxides employed as catalysts in the practice of this invention are dialkylperoxymalonic acid esters. These novel peroxides can be prepared by reacting a dialkylmalonyl halide having the formula:

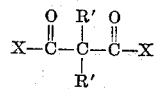

where each R' is as defined hereinabove and X is halogen, for example, chlorine or bromine with an organic hydroperoxide in the presence of an acceptor for halogen halide such as pyridine or sodium or potassium hydroxide at a temperature in the range of about −40° to about 25° C. and more preferably in the range of about 0° to about 10° C.

The dialkylmalonyl halide employed in the above reaction can be prepared by any of the methods known to those skilled in the art to be suitable for this purpose. For example, the halide can be prepared by treating a dialkylmalonic acid with thionyl halide at a temperature in the range of about 50° to about 200° C. A more convenient method, however, is to react phosgene with a suitable dialkylketene such as methylethylketene, butylthylketene, or the like, at a temperature in the range of about 0° to about 100° C. This reaction takes place according to the following equation:

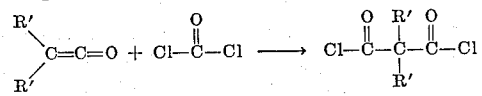

Typical hydroperoxides that can be used in preparing the compounds of this invention are exemplified by isopropyl hydroperoxide, tert-butyl hydroperoxide, tert-amyl hydroperoxide, cyclohexyl hydroperoxide, methylcyclohexyl hydroperoxide, decalin hydroperoxide, tetralin hydroperoxide, cumene hydroperoxide, p-menthane hydroperoxide, p-xylyl hydroperoxide. The reaction between the hydroperoxide and the acid halide can be carried out in a number of ways. For example, the acid halide can be added to an equivalent amount of the peroxide in pyridine solution. Aqueous sodium or potassium hydroxide can also be used as a condensing agent. Alternatively, the sodium salt of the hydroperoxide can be reacted in a slurry in an organic solvent with the acid halide and washed with water to remove the sodium. The reaction is continued to completion which is usually not more than a period of 20 hours.

The dialkylperoxymalonic acid esters prepared according to the procedures described hereinbefore can be characterized by the quantative liberation of iodine from potassium iodide and their infrared spectrum which shows a carbonyl absorption in the range of about 5.4 to about 5.8 microns which absorption is, of course, not shown by the hydroperoxide starting material. The dialkylperoxydicarboxylic esters that are prepared by the aforementioned procedure and employed as catalysts in the practice of this invention include, for example, di-tert-butyl 2,2-dimethylperoxymalonate, di-tert-butyl 2-butyl-2-ethyl-peroxymalonate, bis(1,1-dimethylhexyl) dimethylperoxymalonate, bis(1,1,3,3-tetramethylbutyl) dimethylperoxymalonate, dicyclohexyl diethylperoxymalonate, bis($\alpha,\alpha$-dimethylbenzyl) dimethylperoxymalonate, bis(p - methoxy-$\alpha$-methylbenzyl) dihexylperoxymalonate, and the like.

The R radicals in the formula for the diperoxy dialkyl malonic acid esters, as indicated hereinbefore, can be the same or different alkyl, cycloalkyl, alkaryl, lower alkoxy substituted alkaryl or aryl radicals containing 3–14 carbon atoms. The R radicals are, therefore, generally hydrocarbon radicals free of ethylenic or acetylenic unsaturation and non-hydrocarbon groups although the alkaryl radicals can contain oxygen. Suitable lower alkoxy substituted alkaryl groups include, for example, methoxy, ethoxy or butoxy substituted benzyl radicals. Although the R radicals generally contain 3–14 carbon atoms, those containing 4–10, or more preferably, 4–8 carbon atoms, give good results. Dialkylperoxymalonic acid esters in which each R is an alkyl radical containing up to 8 carbon atoms are particularly effective polymerization catalysts although esters in which the R groups are other alkyl, cycloalkyl, alkaryl, lower alkoxy substituted alkaryl or aryl radicals containing 3–14 carbon atoms give good results. Suitable R radicals, therefore, include propyl, isopropyl, butyl, octyl, decyl, dodecyl, tetradecyl, cyclopentyl, cyclohexyl, cycloheptyl, benzyl, $\alpha$-methylbenzyl, $\alpha$-methoxybenzyl, $\alpha$-butoxybenzyl, $\alpha,\alpha$-dimethylbenzyl, phenyl, methyl, propyl, dibutyl-substituted phenyl, naphthyl and the like. The R' radicals in the formula for the dialkylperoxymalonic acid esters can be any alkyl radical containing up to 8 carbon atoms, preferably 2–6 carbon atoms as exemplified by methyl, propyl, butyl, hexyl, octyl, and the like.

The temperatures employed in the polymerization reaction are subject to wide variation and depend upon such variables as the monomer employed, the duration of heating, the pressure employed, if any, and the type of process, for example, continuous or batch. In general, however, the novel organic peroxides of this invention can be used over a temperature range of about 60° to about 250° C. In a batch process temperatures in the range of about 60° to about 130° C. will give satisfactory results while temperatures in the range of about 140° to about 250° C. are generally preferred in a continuous process. The pressure, if any, to be employed in the practice of this invention, is also subject to wide variation and can be any of the conventional pressures generally employed in such processes. The pressures used will depend to a large extent upon the molecular weight of the polymer desired, and for ethylene, will generally be in the range of about 5,000 to about 50,000 p.s.i. and preferably in the range of about 10,000 to about 30,000 p.s.i. Where ethylenically unsaturated polymerizable compounds other than ethylene, for example, styrene, methyl methacrylate, acrylonitrile, vinyl chloride and the like, are polymerized, the reaction proceeds very well at atmospheric pressure, with pressures in the range of about 1 to about 200 atmospheres being particularly good. The polymerization reaction is carried out in the presence of 5 parts per million to 5%, by weight, of catalyst, based on the monomer to be polymerized, with catalyst concentrations of 10 to 10,000 parts per million being preferred in the case of ethylene. It is also possible to employ chain transfer agents, as exemplified by hydrogen, propane, chlorinated hydrocarbons or mercaptans in the polymerization process of this invention.

The novel catalysts of this invention are extremely versatile and can be employed in the polymerization of any one or mixtures of ethylenically unsaturated polymerizable compounds containing at least one $CH_2=C<$ group and particularly those containing a $CH_2=CH-$ group. These catalysts are particularly suited to the polymerization of monoethylenically unsaturated polymerizable compounds containing 2–10 carbon atoms or mixtures thereof. Suitable polymerizable compounds, therefore, include ethylene, propylene, butene, decene, styrene, acrylic acid, methyl methacrylate, methyl acrylate, vinyl chloride, vinylidene, chloride, butadiene, isoprene and the like.

This invention can be further illustrated by the following examples of preferred embodiments thereof although it will be understood that these examples are included merely for purposes of illustration and are not intended to limit the scope of the invention unless otherwise specifically indicated.

*Example 1*

The novel dialkylperoxymalonic acid esters of this invention are prepared by reacting a dialkylmalonyl halide with a hydroperoxide in the presence of an acceptor for hydrogen halide at low temperatures. To illustrate, di-tert-butyl 2,2-dimethylperoxymalonate is prepared as follows:

3.34 g. (0.037 mole) of tert-butyl hydroperoxide is charged to a 100 cc. stirred reactor and cooled to 10° C. 5.9 g. of 30% potassium hydroxide (0.030 mole) and 1.95 g. (0.0115 mole) of 2,2-dimethylmalonyl chloride in 3 ml. of pentane are added simultaneously over a period of 15 min. The temperature is allowed to rise to 25° C. and the reaction is continued for 18 hours at 25° C.

25 cc. of 5% $Na_2CO_3$ is added to the reaction mixture, after which 25 cc. of pentane is added. The organic layer is separated, washed three times with water and dried over $MgSO_4$. The yield is 22%.

The novel dialkylperoxymalonic acid esters of this invention are extremely effective polymerization catalysts. To illustrate, 1 ml. of a solution containing 1 mg./ml. of the above prepared di-tert-butyl 2,2-dimethylperoxymalonate in heptane is placed in a 100 cc. stainless steel autoclave. After sealing the autoclave is purged with ethylene and sufficient ethylene added to the autoclave to give 20,000 p.s.i. at the desired temperature. The reaction is carried out for 2 hours after which time the autoclave is cooled, vented and the contents discharged, dried and weighed. The results are as follows:

TABLE 1

| Temperature, °C. | Yield, g. | Catalyst Efficiency, g./g. cat. |
|---|---|---|
| 100 | 3.75 | 3,750 |
| 120 | 2.45 | 2,450 |
| 140 | 6.60 | 6,600 |
| 160 | 6.65 | 6,650 |
| 180 | 7.65 | 7,650 |
| 200 | 10.10 | 10,100 |

The novel peroxides of this invention are much more efficient polymerization catalysts than prior art peroxide catalysts now in commercial use. Thus, using the above procedure, lauroyl peroxide gives efficiencies of only 450, 660 and 1,600 g./g. at 125, 145 and 180° C. respectively.

Even structurally closely related organic peroxides do not give the very high yields realized with the novel organic peroxides of this invention. Hence, when monoalkylperoxymalonic acid esters such as di-tert-butyl monobutylperoxymalonate or di-tert-butyl monodecylperoxymalonate are substituted for di-tert-butyl 2,2-dimethyl peroxymalonate in the above runs they decompose practically instantaneously and are, therefore, ineffective catalysts for the polymerization. These same results are also obtained when di-tert-butyl peroxy-oxalate or di-tert-butyl peroxymalonate are substituted in the above polymerization runs.

Example 2

A solution of 2-butyl-2-ethylmalonyl chloride (0.00805 mole) in 5 ml. of pentane is added with stirring to a slurry of the sodium salt of tert-butyl hydroperoxide (0.0201 mole, 4.50 g. of 49.7% peroxide) in 10 ml. of pentane cooled to 5° C. over a period of 10 minutes. An additional 5 ml. of pentane is then added. The mixture is stirred for 15.5 hours and the final temperature is 23° C. Approximately 25 ml. of water is added to the reaction mixture and the organic layer is separated and washed with 25 ml. of 5% $Na_2CO_3$ and then with four 25 ml. portions of water. The pentane layer is dried over $MgSO_4$. The yield is 42.0%.

The di-tert-butyl 2-butyl-2-ethylperoxymalonate prepared by the above procedure is an effective polymerization catalyst for ethylenically unsaturated hydrocarbons containing a $CH_2=C-$ group. To illustrate, one ml. of a heptane solution containing 5 mg./ml. of di-tert-butyl 2-butyl-2-ethylperoxymalonate is placed in a 100 cc. stainless steel autoclave which is sealed. The autoclave is purged with ethylene and sufficient ethylene added to give 20,000 p.s.i. at the temperature desired. The temperature and pressure are maintained for 2 hours after which the autoclave is cooled, vented and the contents discharged. The yields and catalyst efficiencies at the temperatures employed are shown in the following table.

TABLE 2

| Temperature, °C. | Yield, g. | Catalyst Efficiency, g./g. cat. |
|---|---|---|
| 100 | 1.70 | 340 |
| 120 | 7.00 | 1,400 |
| 140 | 5.75 | 1,150 |
| 160 | 6.25 | 1,250 |

In contrast, the use of 5 mg. of lauroyl peroxide in the above procedure gives efficiencies of only 270, 170, and 212 g./g. at temperatures of 110, 130 and 150° C. respectively.

Example 3

Bis(1,1-dimethylhexyl) dimethylperoxymalonate is synthesized by reacting the corresponding hydroperoxide with dimetylmalonyl chloride by the procedure of Example 1. The yield is 45%. Polymerization runs are made with this peroxide as described in Example 1. At pressures of 20,000 lb./sq. in., using 1 mg. of catalyst, the following yields are obtained: At 140° C., 8.5 g.; 160° C., 10.2 g.; 180° C., 13.5 g.; 200° C., 12.6 g.

Example 4

Bis(1,1,3,3-tetramethylbutyl) dimethylperoxymalonate is synthesized by reacting 1,1,3,3-tetramethylbutyl hydroperoxide with phosgene and pyridine in toluene solution at 0° C. The yield is 65.4%. The infrared spectrum of this compound shows a carbonyl absorption at 5.6 microns. One milligram of the catalyst is used for the polymerization of ethylene as described in Example 1. The yields and catalyst efficiencies at various temperatures are given in the following table.

TABLE 3

| Temperature, °C. | Yield, g. | Catalyst Efficiency, g./g. cat. |
|---|---|---|
| 120 | 2.5 | 2,500 |
| 140 | 9.00 | 9,000 |
| 160 | 11.9 | 11,900 |
| 180 | 11.2 | 11,200 |
| 200 | 10.30 | 10,300 |

Example 5

2.0 g. of cyclohexyl hydroperoxide is dissolved in 10 ml. toluene and cooled to 0° C. 35 ml. of cold 5% NaOH solution is added. 10 ml. of 20% solution of diethyl malonyl chloride in toluene is added dropwise over a period of 30 minutes. The reaction mixture is stirred at 0–5° C. for 4 hours, the water layer is removed and the organic layer washed twice with ice water. The yield is 65%, based on titration with potassium iodide. The infrared spectrum of the sample shows a strong carbonyl absorption at 5.6 microns.

As indicated hereinbefore, the novel organic peroxides of this invention can be used to polymerize nonhydrocarbon ethylenically unsaturated polymerizable compounds. To illustrate, dicyclohexyl diperoxy diethyl malonate prepared by the above procedure is used to catalyze the polymerization of styrene, methyl methacrylate and vinyl acetate by the following procedure: 0.10 g. of the peroxide is placed in a vial with 20.0 g. of purified monomer. The vial is flushed with nitrogen and sealed. The vials are heated at 100° C. for 6 hours in an air oven, after which they are cooled to room temperature, opened, and the polymer isolated by dissolving in acetone or benzene and precipitating with methanol. After drying in a circulating air oven, the yields and viscosities are as follows:

TABLE 4

| Monomer | Yield, g. | Inherent Viscosity in Tetralin at 145° C. |
|---|---|---|
| Styrene | 18.8 | 0.65 |
| Methyl methacrylate | 17.2 | 1.72 |
| Vinyl acetate | 19.3 | 0.83 |

Example 6

Bis(α,α-dimethylbenzyl) dimethylperoxymalonate is synthesized by reaction of cumene hydroperoxide with a toluene solution of dimethylmalonyl chloride in the presence of pyridine as in Example 1. After a reaction time of 4 hours at 10° C. the toluene solution is washed with water and dried over sodium sulfate. The yield of peroxide is 48% based on titration with potassium iodide. The peroxide shows a strong carbonyl absorption in the range from 5.5–5.7 microns in the infrared.

Bis(α,α-dimethylbenzyl) dimethylperoxymalonate is used to catalyze the polymerization of styrene, methyl methacrylate and vinyl acetate at 60° C. by placing 0.10 gram of the peroxide in toluene solution in a vial and removing the toluene by pumping under vacuum. Twenty grams of purified monomer is charged and the vial sealed after flushing with nitrogen. The vials are heated for four hours at the desired reaction temperature, then cooled to room temperature and opened. The polymer can then be dissolved in a suitable solvent such as acetone, toluene or benzene, precipitated with methanol, filtered, dried and weighed. The yield and inherent viscosities of the products are shown in the table below:

TABLE 5

| Monomer | Yield, g. | Inherent Viscosity in Tetralin at 145° C. |
|---|---|---|
| Styrene | 19.5 | 0.56 |
| Vinyl acetate | 17.2 | 0.35 |
| Methyl methacrylate | 18.3 | 0.72 |

*Example 7*

Bis(p-methoxy-α-methylbenzyl) dihexylperoxymalonate is prepared by reacting 1.5 grams of the sodium salt of p-methoxy-α-methylbenzyl hydroperoxide with 27.0 ml. of a 20% solution of dihexylmalonyl chloride in a toluene dispersion cooled to −10° C. After 6 hours the toluene is washed with water until neutral and dried over anhydrous magnesium sulfate. The yield of peroxide is 37%. The compound shows a strong carbonyl absorption at 5.6 microns and no evidence of hydroxyl by infrared. This peroxide, when used as a polymerization catalyst in the procedure of Example 1 gives the same good results.

*Example 8*

Organic peroxides which are closely related structurally to the novel organic peroxides of this invention are ineffective polymerization catalysts under the claimed conditions, even when up to 500% more peroxide is used. To illustrate, 1 ml. of a solution containing 1 mg./ml. of di-tert-butyl 2,2-dimethylperoxymalonate is placed in a 100 cc. stainless steel autoclave. After sealing, the autoclave is purged with ethylene and sufficient ethylene is added to the autoclave to give 20,000 p.s.i. at the desired temperature. The reaction is carried out for two hours after which time the autoclave is cooled, vented and the contents discharged, dried and weighed. The following table gives the yield of polymer at various temperatures for di-tert-butyl 2,2-dimethylperoxymalonate.

TABLE 6

| Temperature, ° C. | Yield, g. | Catalyst Efficiency, g./g. cat. |
|---|---|---|
| 100 | 3.75 | 3,750 |
| 120 | 2.45 | 2,450 |
| 140 | 6.60 | 6,600 |
| 160 | 6.65 | 6,650 |
| 180 | 7.65 | 7,650 |
| 200 | 10.10 | 10,100 |

In contrast, di-tert-butyl peroxyoxalate in an amount of 5 mg. in the same procedure gives the following results:

TABLE 7

| Temperature, ° C. | Yield, g. | Catalyst Efficiency, g./g. cat. |
|---|---|---|
| 80 | 0.13 | 26 |
| 110 | 0.90 | 160 |

Thus, this invention provides the art with a class of novel organic peroxides that are effective catalysts for the polymerization of ethylenically unsaturated polymerizable compounds over a broad temperature range. Polymerization processes employing these catalysts are, therefore, economically attractive and permit the preparation of polymers containing a very low percentage of catalyst residue. Such polymers, particularly polyethylene, can be used in many electrical applications such as telephone wire insulation, high frequency cable, television cable, etc. The novel organic peroxides of this invention can also be used as catalyst for free radical reactions such as halogenation, telomerization, dimerization, cross-linking, and the like.

Although this invention has been described in considerable detail with reference to certain preferred embodiments thereof, it will be understood that variations and modifications can be effected without departing from the spirit and scope of the invention as described hereinabove and as defined in the appended claims.

We claim:
1. The process for the polymerization of an unsaturated polymerizable compound containing a $CH_2=C<$ group which comprises polymerizing said compound at a temperature in the range of about 60° to about 250° C. and a pressure in the range of about atmospheric pressure to about 50,000 p.s.i. in the presence of about 5 parts per million to 5%, by weight, of a peroxydicarboxylic acid ester having the formula:

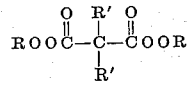

where each R is a member selected from the group consisting of alkyl, cycloalkyl, lower alkoxy substituted alkaryl and aryl radicals containing 3–14 carbon atoms and each R' is an alkyl radical containing up to 8 carbon atoms.

2. The process of claim 1 where each R in the ester contains 4–10 carbon atoms and each R' contains 2–6 carbon atoms.
3. The process of claim 1 where the ester is di-tert-butyl 2,2-dimethylperoxymalonate.
4. The process of claim 1 where the ester is di-tert-butyl 2-butyl-2-ethylperoxymalonate.
5. The process of claim 1 where the ester is bis(1,1-dimethylhexyl) dimethylperoxymalonate.
6. The process of claim 1 where the ester is bis(1,1,3,3-tetramethylbutyl) dimethylperoxymalonate.
7. The process of claim 1 where the ester is dicyclohexyl diethylperoxymalonate.
8. The process of claim 1 where the ester is bis(α,α-dimethylbenzyl) dimethylperoxymalonate.
9. The process of claim 1 where the ester is bis(p-methoxy-α-methylbenzyl) dihexylperoxymalonate.

References Cited

UNITED STATES PATENTS

| 2,839,571 | 6/1958 | Johnston et al. | 260—485 |
| 3,080,416 | 5/1963 | Durr et al. | 260—485 |
| 3,114,740 | 12/1963 | Kropa | 260—89.5 |
| 3,116,271 | 12/1963 | Watt et al. | 260—89.5 |

FOREIGN PATENTS 678,216  8/1952  Great Britain.

JOSEPH L. SCHOFER, *Primary Examiner.*

HARRY WONG, *Assistant Examiner.*